(12) United States Patent
Oudemans

(10) Patent No.: US 8,413,737 B2
(45) Date of Patent: Apr. 9, 2013

(54) IMPLEMENT AND ASSEMBLY FOR CARRYING OUT OPERATIONS ON AN AGRICULTURAL LAND

(75) Inventor: Jelle Fredo Oudemans, The Hague (NL)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 13/551,671

(22) Filed: Jul. 18, 2012

(65) Prior Publication Data

US 2012/0279734 A1 Nov. 8, 2012

Related U.S. Application Data

(63) Continuation of application No. PCT/NL2011/000002, filed on Jan. 19, 2011.

(51) Int. Cl.
*A01B 61/00* (2006.01)

(52) U.S. Cl.
USPC ........... 172/261; 172/439; 172/449; 172/272; 172/47

(58) Field of Classification Search .............. 172/47, 172/233, 261, 272, 439, 449
See application file for complete search history.

(56) References Cited

U.S. PATENT DOCUMENTS

| 4,147,376 A | 4/1979 | Slazas |
| 4,970,848 A | 11/1990 | Neuerburg et al. |
| 5,193,623 A * | 3/1993 | Burette ........................... 172/47 |
| 5,950,735 A * | 9/1999 | Godbersen .................... 172/439 |
| 7,461,702 B2 * | 12/2008 | Farnsworth et al. .......... 172/439 |

FOREIGN PATENT DOCUMENTS

| EP | 1522213 A1 | 4/2005 |
| FR | 1389032 A | 1/1965 |
| FR | 2860125 A1 | 4/2005 |

OTHER PUBLICATIONS

International Search Report of PCT/NL2011/000002 issued on Mar. 22, 2011.

* cited by examiner

*Primary Examiner* — Jamie L McGowan
(74) *Attorney, Agent, or Firm* — Hoyng Monegier LLP; Coraline J. Haitjema; David P. Owen

(57) ABSTRACT

An implement for soil preparation is moved in a direction of travel by a tractor with a three-point linkage. The implement includes an attaching mechanism, a coupling member with three coupling points, a first tool beam which is attached to the coupling member, at least one tool which is supported by the first tool beam, and three coupling elements which are each movably attached to the coupling member in the region of the respective coupling points to connect the coupling member to the attaching means. The first coupling element defines a path of movement for a guided movement of the first coupling point with respect to the attaching means. The second and the third coupling element each define a path of movement for a guided movement of their respective coupling point with respect to the attaching mechanism.

16 Claims, 15 Drawing Sheets

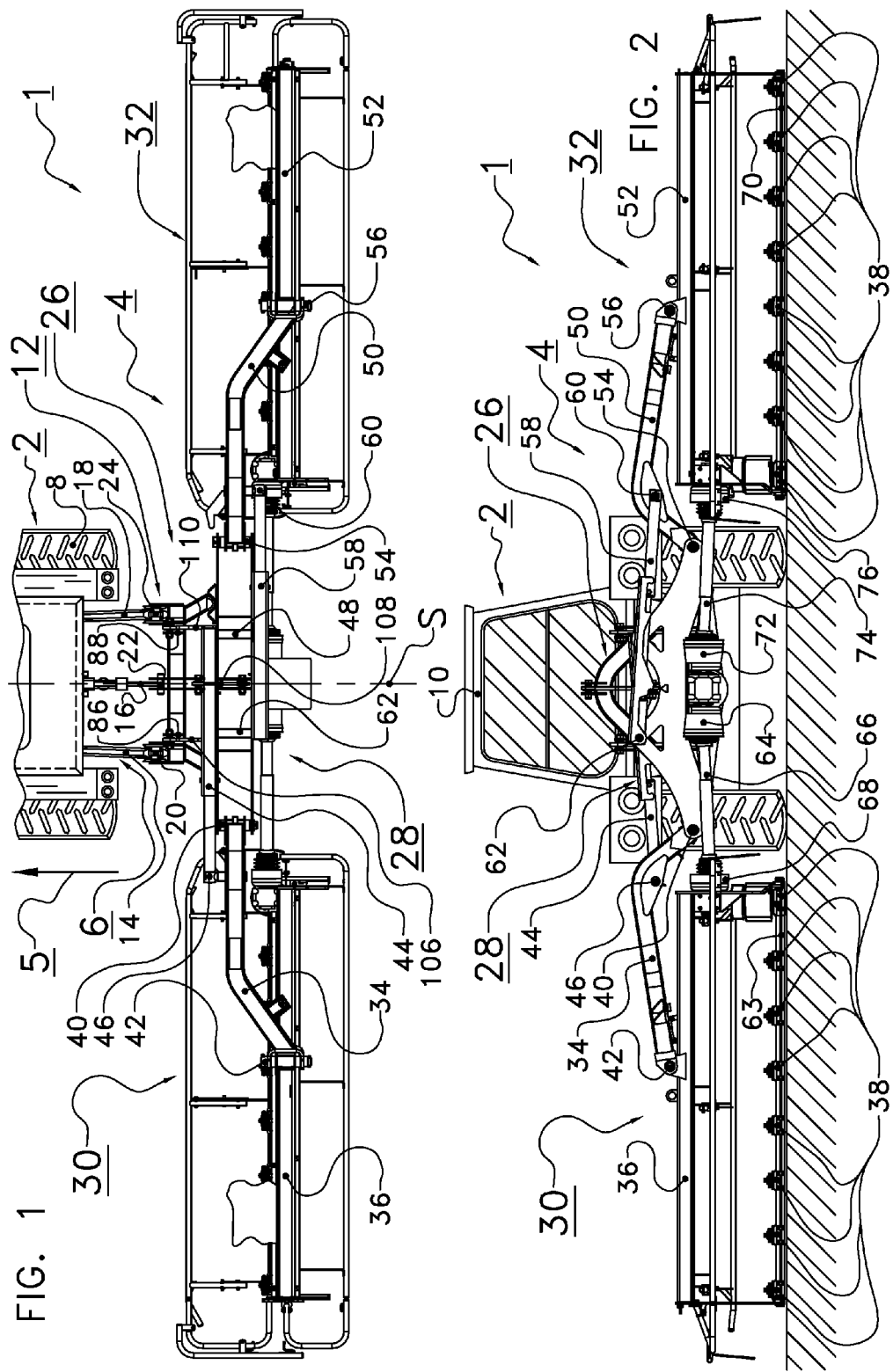

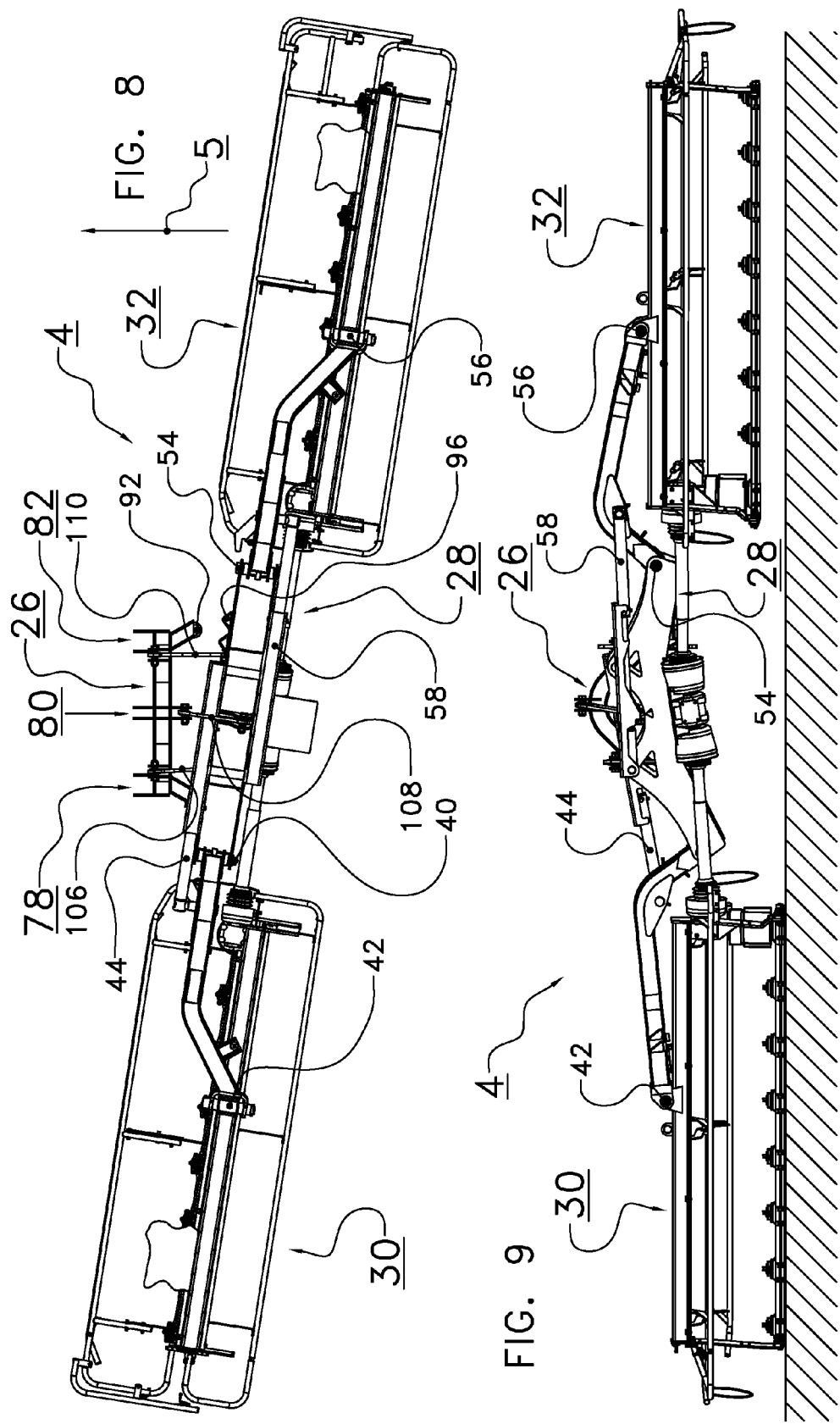

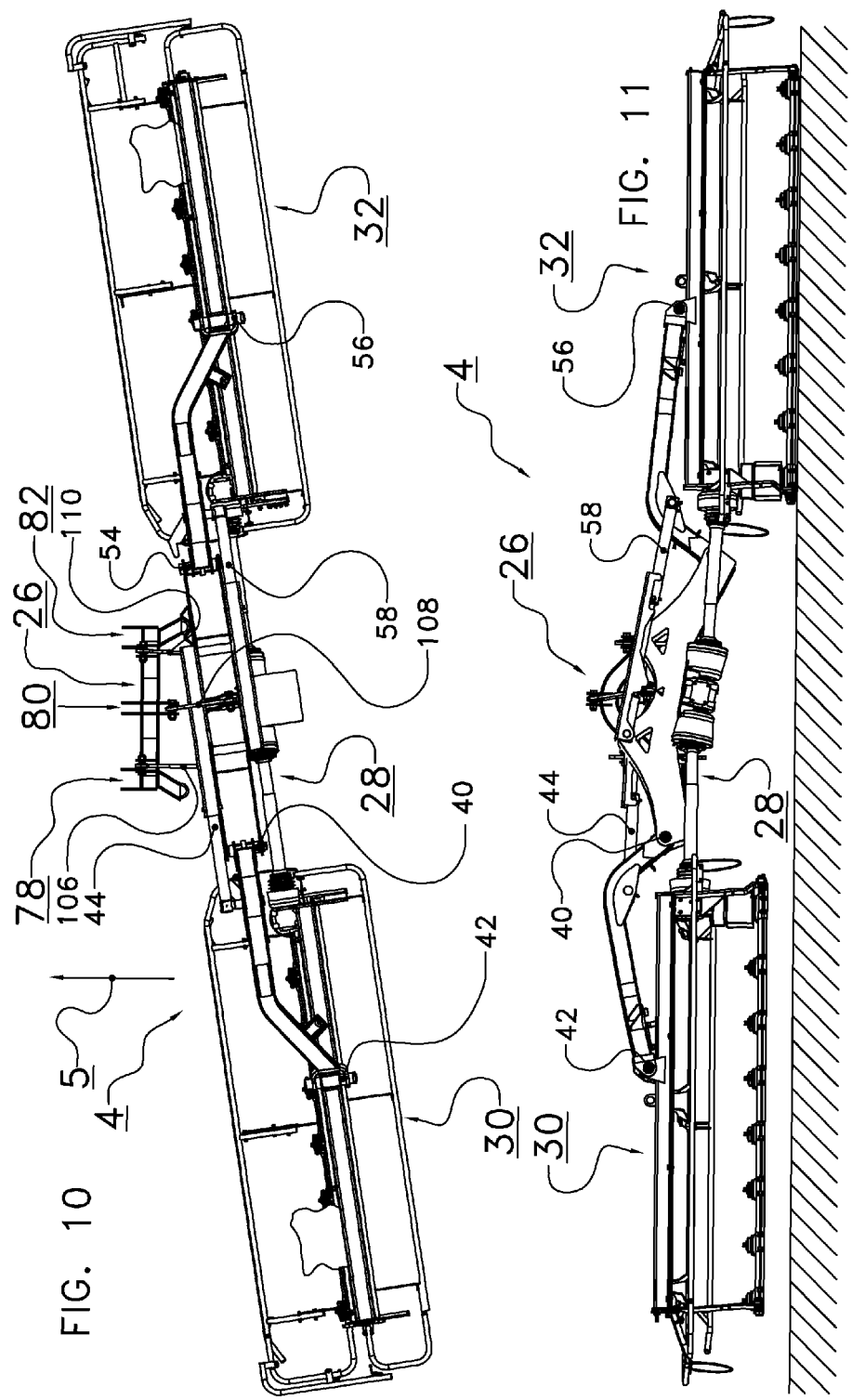

IMPLEMENT AND ASSEMBLY FOR CARRYING OUT OPERATIONS ON AN AGRICULTURAL LAND

CROSS REFERENCE TO RELATED APPLICATIONS

This application is a continuation of PCT application number PCT/2011/000002 filed on 19 Jan. 2011, which claims priority from Netherlands application number 1037632 filed on 19 Jan. 2010. Both applications are hereby incorporated by reference in their entireties.

BACKGROUND OF THE INVENTION

1. Field of the Invention

The present invention relates to an implement for carrying out operations on an agricultural land, which implement is configured to be moved in a direction of travel by a tractor with a three-point linkage.

2. Description of the Related Art

EP-B1-1.300.065, hereby incorporated by reference in its entirety, discloses a mowing device which is provided with attaching means to be attached to a three-point linkage of a tractor. The mowing device comprises a tool beam with mowing discs. The tool beam is connected to a three-point hitch. The three-point hitch is connected to the attaching means via hinges and a hingeable beam. A first hinge connects the three-point hitch at the side of the tool beam directly to the attaching means at that side. A second hinge connects the three-point hitch in the middle of the implement to the middle attaching means. The hingeable beam is provided at the side of the three-point hitch that is faced away from the tool beam. The hingeable beam is at one end hingeably connected to the attaching means at that side. The other end of the hingeable beam is hingeably connected to the three-point hitch. When the tool beam hits an obstacle during use, the tool beam will exert a force on the three-point hitch, as a result of which the three-point hitch will rotate with respect to the attaching means. For this purpose, the three-point hitch pivots about its hinges and the hingeable beam rotates.

A drawback of the known mowing device is that the mowing result is irregular if obstacles causing the three-point hitch to break out are actually present.

BRIEF SUMMARY OF THE INVENTION

The invention aims at obviating the above-mentioned drawback at least partially, or at providing an alternative. The invention aims in particular at providing an implement which provides a more regular operating result of the agricultural land if obstacles are present on the agricultural land.

This object is achieved by the invention by means of an implement for carrying out operations on an agricultural land, which implement is configured to be moved in a direction of travel by a tractor with a three-point linkage. The implement comprises:
attaching means (e.g., attaching mechanism) for attaching the implement to the three-point linkage of the tractor;
a coupling member, which is movably connected to the attaching means and which comprises a first, a second and a third coupling point;
a first tool beam, which is attached to the coupling member and which extends from the coupling member substantially transversely to the direction of travel;
at least one tool, which is supported by the first tool beam and which is configured to carry out the operations on the agricultural land; and
a first, a second and a third coupling element, which are each movably attached to the coupling member in the region of the first, the second and the third coupling point, respectively, to connect the coupling member to the attaching means;
wherein the first coupling element defines a path of movement for a guided movement of the first coupling point with respect to the attaching means. The second and the third coupling element each define a path of movement for a guided movement of the second and the third coupling point, respectively, with respect to the attaching means. The implement further comprises a support frame at its side that faces the tractor, wherein at least a part of the attaching means is provided on the support frame and at least a part of the coupling elements is connected to the attaching means via the support frame. The support frame comprises a first abutment member and the coupling member comprises a first support point which co-operates with the first abutment member, to transfer a force in the direction of travel of the implement.

By making three coupling elements, instead of one coupling element, define a path of movement, in certain cases it will suffice for the tool beam to make smaller deviations to move over an obstacle. For example, the known tool beam will have to rotate over a relatively large angle when a mowing disc that is provided on the tool beam in a position relatively close to the three-point hitch hits an obstacle. This results in a relatively large deflection of the outermost mowing disc, i.e. the mowing disc that is provided at the ultimate end of the tool beam. This further results in a relatively large difference between the deflection of the outermost mowing disc and the innermost mowing disc. Each of both effects leads for itself to an irregular mowing pattern. On account of the coupling elements according to the invention, the coupling member will make a smaller angular rotation than the known three-point hitch, so that both the absolute deflection of the outermost mowing disc and the difference between the deflection of the outermost and the innermost mowing disc is smaller than in the state of the art. Such a support frame further enables to bring attaching means in a fixed position with respect to each other, so that it is simpler to attach them to the three-point linkage of the tractor. Additionally, on account of said first abutment member and first support point, the coupling member will be supported in a stable manner on the support frame during normal use, and the chance that the coupling member will move with respect to the support frame via the coupling elements at moments when it is not necessary to avoid an object, will be reduced. As soon as an obstacle should indeed be avoided, the coupling element can rotate on the abutment member in a manner which is further defined by the paths of movement of the coupling elements. Moreover, it is achieved that the at least one tool will remain substantially parallel to the agricultural land during avoiding an obstacle.

More in particular, the first abutment member is preferably located on a coupling member part situated opposite to the first tool beam. The rotating arm of each of the tools is thus enlarged with respect to the attaching means in comparison with an implement in which the abutment member is located in the middle of the implement, or on the coupling member part situated at the side of the first tool beam. As a result thereof, a smaller rotation of the tool beam suffices to achieve an equal movement of the tools.

In one embodiment, at least one of the first, the second and the third coupling element is a rod which is hingeably connected to the coupling element in the region of the respective coupling point. A rod is a constructively simple and robust manner to enable a path of movement for the respective coupling point.

In one embodiment, the implement further comprises a second tool beam which supports at least one tool, is attached to the coupling member and extends from the coupling member in a direction substantially opposite to the direction of the first tool beam. One coupling member thus supports two tool beams, which results in a relatively simple construction in which both tool beams can break out, while using the same coupling elements.

In particular, the support frame comprises a second abutment member and the coupling member comprises a second support point which co-operates with the second abutment member, to transfer a force in the direction of travel of the implement, wherein the first and the second support point are located in a plane transverse to the direction of travel on either side of the middle of the support frame. There is thus achieved for both tool beams an abutment member which is located on the coupling member part situated opposite to the tool beam in question. This results in a relatively large rotating arm for the tools on each of the tool beams.

In one embodiment, the first coupling element is a first rod, the second coupling element is a second rod and the third coupling element is a third rod. The first, the second and the third rod each extend from the coupling member to the support frame, are each hingeably connected to the coupling element in the region of the respective coupling point and are each hingeably connected to the support frame. Such an embodiment is constructively simple and robust.

In another embodiment, the first and possibly the second tool beam are rotatably connected to the coupling member to pivot the tool beam in question upwards with respect to the coupling member. This makes it possible to bring the tool beam in question into a transport position.

In particular, the implement further comprises a first actuator, which is connected to the coupling member and the first tool beam, to pivot the first tool beam.

More in particular, the implement further comprises spring means (e.g. spring mechanism), which are connected to the coupling member and the first and possibly the second tool beam, to resiliently transfer at least a part of the weight of the tool beam in question to the coupling member. As a result thereof, a rotation of the coupling element need not immediately result in a lifting of the tool beam in question, but will in the first instance only reduce the ground pressure of this tool beam.

The implement comprises in particular a stabilisator, one free end of which is hingeably connected to the coupling member and a second free end of which is hingeably connected to the support frame. An unintentional sideward movement of the mowing device during use can thus be prevented.

In particular, the stabilisator substantially extends between the first coupling element and the third coupling element, so that the movement of the coupling member with respect to the support frame during the deviation of the at least one tool beam is not impeded.

In particular, the stabilisator is adjustable in length, so that the mowing device can be brought into an offset position with respect to the direction of travel of the tractor.

In particular, the stabilisator is a hydraulic cylinder which is adjustable in length, in particular a double-acting hydraulic cylinder, so that the offset position can be set in a simple manner.

The invention further relates to an assembly for carrying out operations on an agricultural land, which comprises an implement and a tractor, further comprising a stabilisator, one free end of which is hingeably connected to the coupling member and a second free end of which is hingeably connected to the support frame.

BRIEF DESCRIPTION OF THE DRAWINGS

The features and advantages of the invention will be appreciated upon reference to the following drawings, in which:

FIG. 1 shows a partial top view of an assembly of a tractor and an implement according to the invention in an operative position;

FIG. 2 shows a rear view of the assembly of FIG. 1;

FIG. 8 shows a top view of the implement in the first broken-out position;

FIG. 9 shows a rear view of the implement in the first broken-out position;

FIG. 10 shows a top view of the implement in the second broken-out position;

FIG. 11 shows a rear view of the implement in the second broken-out position;

DESCRIPTION OF ILLUSTRATIVE EMBODIMENTS

Figure 3:
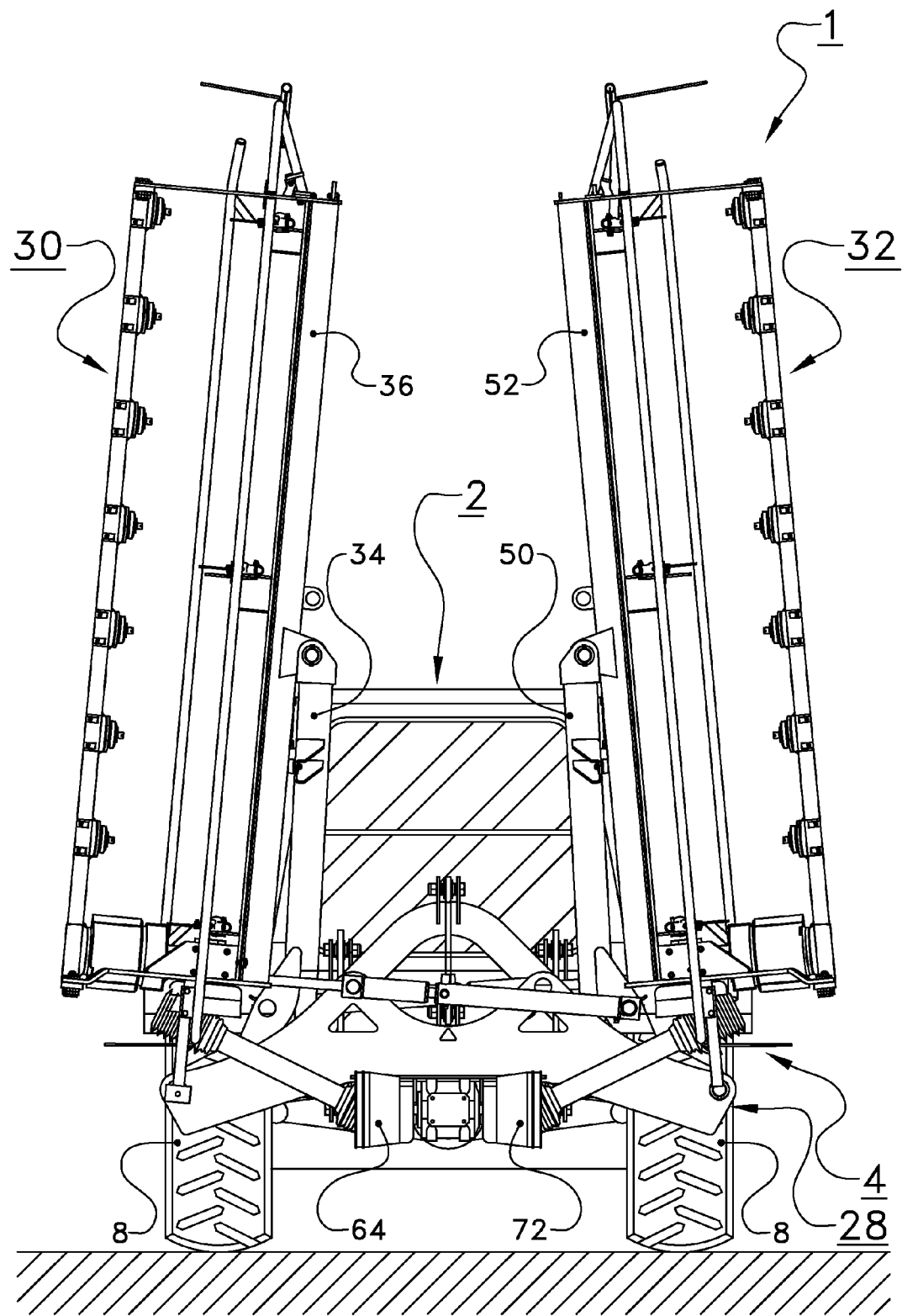
FIG. 3 shows a rear view of the assembly of FIG. 1, with the implement in a transport position.

The following is a description of certain embodiments of the invention, given by way of example only and with reference to the drawings. FIGS. 1 and 2 show an assembly according to the invention, which is denoted as a whole by reference numeral 1. The assembly 1 comprises a tractor 2 and an implement for carrying out operations on an agricultural land, in this embodiment a mowing device 4. For this purpose, the assembly 1 can move in a direction of travel which is denoted by arrow 5 and which substantially equals a longitudinal direction of the tractor 2. Within this description, terms such as longitudinal position, longitudinal direction, transverse position and transverse direction are related to the direction of travel 5. The terms "above" and "below" are related to the assembly in a normal operative position, in which the mowing device is in an operative position as shown in FIGS. 1 and 2. These definitions apply, unless specifically indicated otherwise.

The tractor 2 comprises a tractor frame 6, wheels 8, a cabin 10, a three-point linkage 12 and a power take-off (not visible in the figures). The tractor 2 defines a longitudinal axis S which substantially coincides with the direction of travel or movement 5. The three-point linkage 12 comprises a left lifting rod 14, a top rod 16 and a right lifting rod 18, which are movably connected to the tractor frame 6. Rear ends of the rods 14-18 are attached in a customary manner to the mowing device 4 by means of ball joints 20, 22 and 24.

The mowing device 4 comprises a support frame in the form of a support frame 26, a coupling member 28, a first, in this case left, tool beam 30, and a second, in this case right, tool beam 32. The left tool beam 30 comprises a left intermediate arm 34, a left support beam 36, and tools, here in the form of mowing discs 38. The left tool beam 30, in particular the left support beam 36, supports the mowing discs 38. The left intermediate arm 34 is connected to the coupling member 28 by means of a hinge 40. The left support beam 36 is connected to the left intermediate arm 34 by means of a hinge 42. A left cylinder assembly 44 is attached, at a first end, to the left intermediate arm 34 by means of a hinge 46, and, at a second end opposite to the first end, to the coupling member 28 by means of a hinge 48. The hinge 48 is located at the side situated opposite to the left tool beam 30, in this case the right side, of the coupling member 28. The left cylinder assembly 44 acts as a first actuator, to lift the left tool beam 30. The left cylinder assembly 44 is further connected to a non-shown accumulator in order to form a spring. Said spring is adjustable by setting the pressure in the accumulator. This makes it possible to regulate the ground unloading by means of the left cylinder assembly 44, so that the weight of the left tool beam 30, including the mowing discs 38, will partially be carried by the tractor, via the left cylinder assembly 44, the coupling member 28 and the support frame 26, and will partially be supported on the ground.

The right tool beam 32 comprises a right intermediate arm 50, a right support beam 52 and mowing discs 38. The right tool beam 32, in particular the right support beam 52, supports the mowing discs 38. The right intermediate arm 50 is connected to the coupling member 28 by means of a hinge 54. The right support beam 52 is connected to the right intermediate arm 50 by means of a hinge 56. A right cylinder assembly 58 is attached, at a first end, to the right intermediate arm 50 by means of a hinge 60, and, at a second end opposite to the first end, to the coupling member 28 by means of a hinge 62. The hinge 62 is located at the side situated opposite to the right tool beam 32, in this case the left side, of the coupling member 28. The right cylinder assembly 58 acts as a second actuator, to lift the right tool beam 32. The right cylinder assembly 58 is further connected to a non-shown accumulator, to form an adjustable spring. This makes it possible to regulate the ground unloading of the right tool beam 32 by means of the right cylinder assembly 58.

In the operative position shown in FIGS. 1, 2 and 8-11, the left tool beam 30 and the right tool beam 32 extend from the coupling member 28 in substantially opposite directions. By 'substantially opposite' is meant within the scope of the invention an angle between 90 and 270 degrees, in particular between 120 and 240 degrees, and more in particular between 150 and 210 degrees. The left tool beam 30 and the right tool beam 32 each extend in a direction substantially transverse to the direction of travel 5. By 'substantially transverse' is meant within the scope of the invention an angle between 45 and 135 degrees, in particular between 60 and 120 degrees, and more in particular between 75 and 105 degrees. FIG. 3 shows the mowing device 4 in a transport position which has been achieved by retracting the left cylinder assembly 44 and the right cylinder assembly 58, so that the left tool beam 30 and the right tool beam 32 pivot upwardly about their respective hinges 40, 54.

The mowing discs 38 of the left tool beam 30 are driven by a drive shaft 63 which is driven itself by the power take-off of the tractor 2, via a transmission 64, a telescopic drive shaft 66 and a transmission 68. The mowing discs 38 of the right tool beam 32 are driven by a drive shaft 70, which is driven itself by the power take-off of the tractor 2, via a transmission 72, a telescopic drive shaft 74 and a transmission 76.

The support frame 26 is provided with left, middle and right attaching means for attaching the mowing device 4 to the three-point linkage 12 of the tractor 2 in the form of a left double attaching plate 78, a double attaching plate 80 located in the middle and a right double attaching plate 82, as visible in FIGS. 4-7. The double attaching plates 78, 80, 82 are each provided with an attaching hole 84 for receiving an attaching pin which is not shown in detail and which engages the ball joints 20, 22 and 24 of the three-point linkage 12. The double attaching plate 80 located in the middle extends in this embodiment, viewed from the support frame 26, both to the side of the support frame that faces the tractor and to the side of the support frame that is faced away from the tractor. The attaching holes 84 for the three-point linkage 12 are provided in the double attaching plate 80 located in the middle, at the side of the support frame 26 that faces the tractor.

On the support frame 26, between the left double attaching plate 78 and the double attaching plate 80 located in the middle, there is provided a left double coupling plate 86, and, between the right double attaching plate 82 and the double attaching plate 80 located in the middle, there is provided a right double coupling plate 88. The support frame 26 is provided with coupling element attaching points located on the left side, the right side and in the middle, in this embodiment in the form of coupling rod holes 90. The coupling rod holes 90 are provided in the left double coupling plate 86, in the right double coupling plate 88, and in that side of the double attaching plate 80 located in the middle that is faced away from the tractor 2, respectively. The left and right coupling element attaching points, in this case the coupling rod holes 90 of the left double coupling plate 86 and of the right double coupling plate 88, are at the same level, in the same longitudinal position, and at a mutual distance from each other, viewed in the transverse direction of the mowing device 4. The coupling element attaching points located in the middle, in this case the coupling rod holes 90 of the double attaching plate 80 located in the middle, are at a higher level than the coupling rod holes 90 of the left double coupling plate 86 and of the right double coupling plate 88. The coupling element attaching points located in the middle, in this case the coupling rod holes 90 of the double attaching plate 80 located in the middle, are located behind the coupling rod holes 90 of the left double coupling plate 86 and of the right double coupling plate 88, viewed in the direction of travel 5 of the mowing device 4, and between the coupling rod holes 90 of the left double coupling plate 86 and of the right double coupling plate 88, viewed in the transverse direction of the mowing device 4.

The support frame 26 is further provided with a left abutment member 92 and a right abutment member 94. The left abutment member 92 and the right abutment member 94 are designed as elements projecting from the support frame 26, in this case as V-shaped elements, at any rate as arms or cams extending from the support frame 26 and having a free end of a substantially V-shaped design (see for example FIG. 7). The coupling member 28 is provided with support points that are shaped and positioned complementarily, formed by a left support point 96 and a right support point 98, respectively. In the neutral position, the left support point 96 engages the left abutment member 92 and the right support point 98 engages the right abutment member 94, to transfer longitudinal forces from the mowing device 4, in particular from the tool beams 30 and 32, via the support frame 26 and the three-point linkage 12, to the tractor 2. The engaging abutment members and support points form in pairs a positively locked connection and are thus able to absorb forces in a direction transverse to the direction of travel 5 (see for example FIG. 1). It is thus possible to prevent the mowing device 4 from moving unintentionally sidewards during use.

The left abutment member 92 and the right abutment member 94 are advantageously in substantially the same position with respect to the support frame 26 as the left and the right attaching means, in this case the left double attaching plate 78 and the right double attaching plate 82. This means that the longitudinal forces exerted on the left abutment member 92 and the right abutment member 94 can be directed almost directly to the three-point linkage 12, without substantially loading the support frame 26 on bending stress. This is beneficial to the stability of the mowing device 4.

Coupling points, here in the form of a left coupling hole 100, a coupling hole 102 located in the middle, and a right coupling hole 104, are located on the coupling member 28. The coupling holes 100, 102, 104 are provided in a left part, a part located in the middle, and a right part of the coupling member 28, respectively. In the neutral position of the coupling member 28, the left coupling hole 100 and the right coupling hole 104 are at the same level, in the same longitudinal position and at a mutual distance in the transverse direction of the mowing device 4. In the neutral position of the coupling member 28, the coupling hole 102 located in the middle is at a higher level than the left coupling hole 100 and the right coupling hole 104. In the neutral position of the coupling member 28, the coupling hole 102 located in the middle is behind the left coupling hole 100 and the right coupling hole 104, viewed in the direction of travel 5 of the mowing device 4, and between the left coupling hole 100 and the right coupling hole 104, viewed in the transverse direction of the mowing device 4. This mutual positioning of the coupling holes 100, 102, 104 is in general advantageous to all forms of coupling points.

The mowing device 4 further comprises a first, a second and a third coupling element, here in the form of a left coupling rod 106, a coupling rod 108 located in the middle, and a right coupling rod 110. The left coupling rod 106 is substantially S-shaped. The left coupling rod 106 is hingeably connected at a first end, in this case by means of a non-visible ball joint, to the left coupling hole 100. The left coupling rod 106 is hingeably connected at a second end, in this case by means of a non-visible ball joint, to the coupling rod holes 90 in the left double coupling plate 86. The left coupling rod 106 thus extends from the left coupling hole 100 to the coupling rod holes 90 in the left double coupling plate 86. The coupling rod 108 located in the middle is substantially straight. The coupling rod 108 located in the middle is hingeably connected at a first end, in this case by means of a non-visible ball joint, to the coupling hole 102 located in the middle. The coupling rod 108 located in the middle is hingeably connected at a second end, in this case by means of a non-visible ball joint, to the coupling rod holes 90 in the double coupling plate 80 located in the middle. The coupling rod 108 located in the middle thus extends from the coupling hole 102 located in the middle to the coupling rod holes 90 in the double coupling plate 80 located in the middle. The right coupling rod 110 is substantially S-shaped. The right coupling rod 110 is hingeably connected at a first end, in this case by means of a non-visible ball joint, to the right coupling hole 104. The right coupling rod 110 is hingeably connected at a second end, in this case by means of a non-visible ball joint, to the coupling rod holes 90 in the right double coupling plate 88. The right coupling rod 110 thus extends from the right coupling hole 104 to the coupling rod holes 90 in the right double coupling plate 88.

The positions of the coupling element attaching points, here in the form of the coupling rod holes 90, and of the left coupling points, the coupling points located in the middle and the right coupling points, here in the form of the left coupling holes 100, the coupling holes 102 located in the middle, and the right coupling holes 104, are mutually selected in such a manner that the left coupling rod 106, the coupling rod 108 located in the middle, and the right coupling rod 110 extend operatively substantially parallel. By "extend operatively" is meant extend in a straight line between the coupling rod holes 90 at one side, and the left coupling holes 100, the coupling holes 102 located in the middle and the right coupling holes 104 at the other side. The coupling member 28 will thus remain substantially upright when hinging rearwards and upwards under the guidance of the coupling rods 106, 108, 110. By adjusting the positioning of the coupling rod holes 90, and/or of the left coupling holes 100, the coupling holes 102 located in the middle, and the right coupling holes 104, it can be achieved that the coupling member tilts rearwards when hinging upwards, as described in more detail in the earlier patent application NL-1.036.216.

During use, the mowing device 4 can assume the operative position, as shown in FIGS. 1 and 2, or the transport position, as shown in FIG. 3. In order to switch between these positions, hydraulic liquid is supplied in such a manner to the left cylinder assembly 44 and the right cylinder assembly 58 that the cylinder assemblies 44, 58 in question retract, extend, respectively, in order thus to raise, to lower, respectively, the left tool beam 30 and the right tool beam 32.

Figure 4:
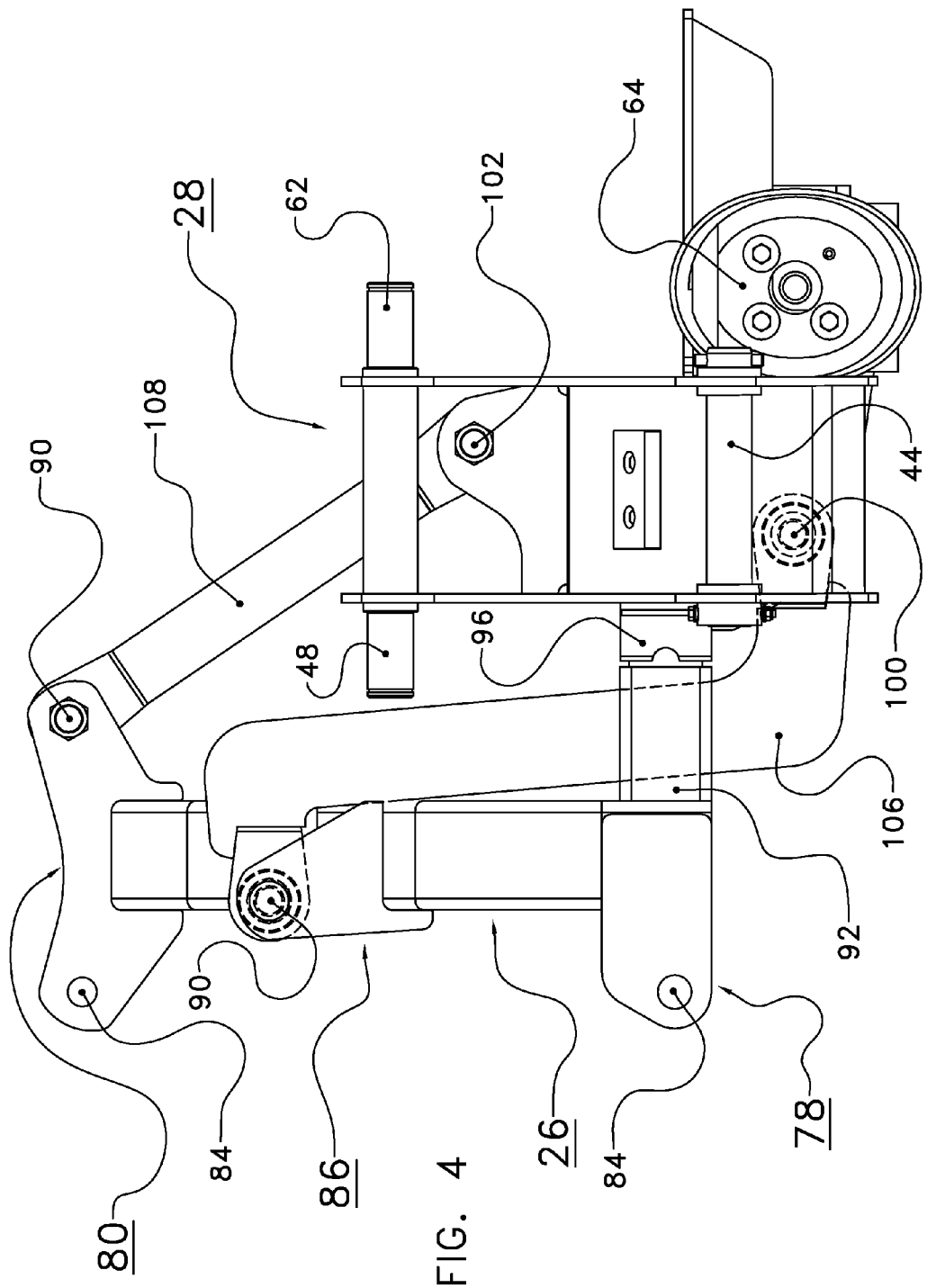
FIG. 4 shows a side view of a support frame and a coupling member of the implement of FIG. 1.
Figure 5:
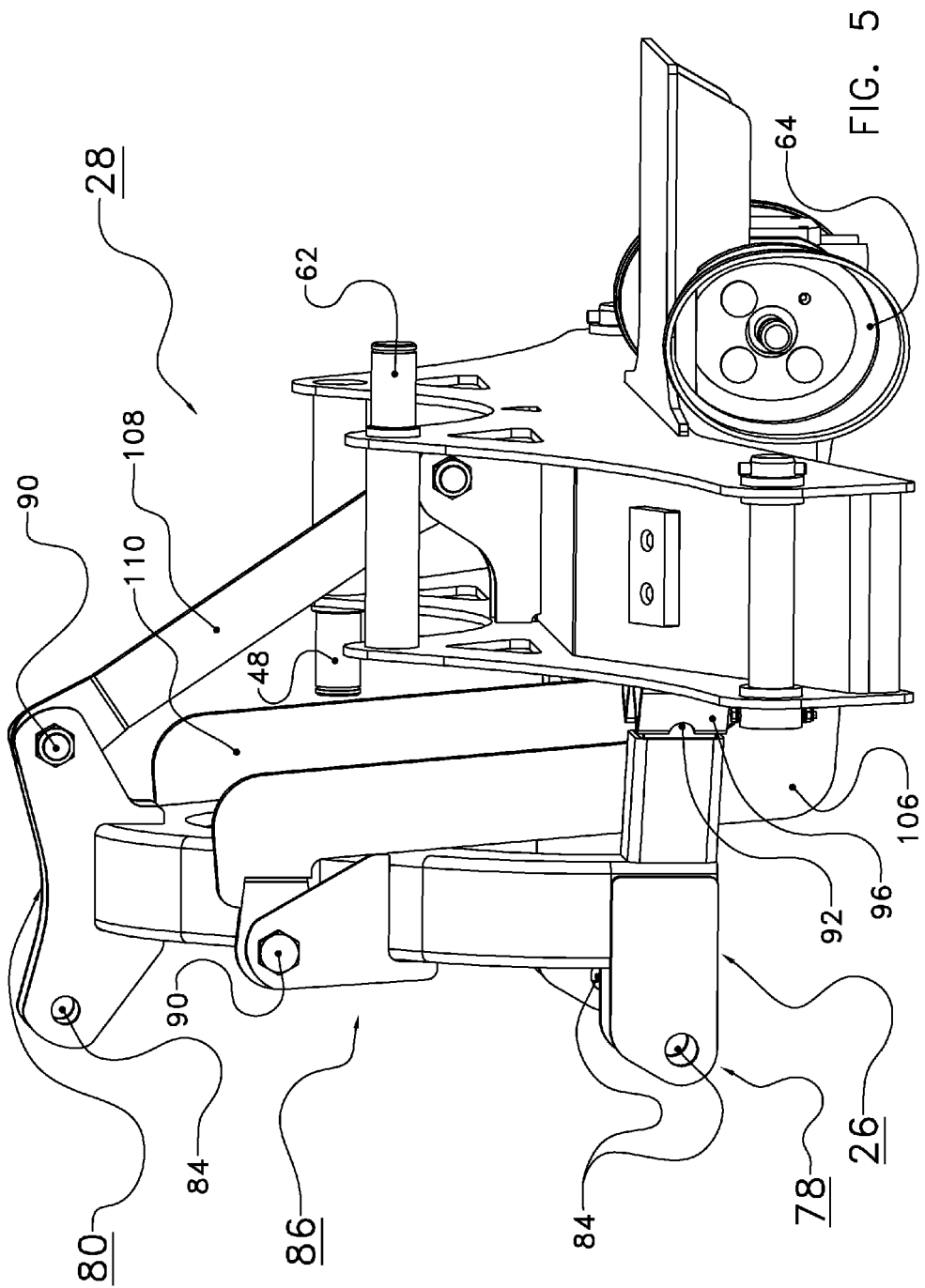
FIG. 5 shows a spatial view of the support frame and the coupling member of FIG. 4, with the coupling member in a neutral position.

In the operative position, the coupling member 28 will assume the neutral position during normal use, as shown in FIGS. 4 and 5. The left tool beam 30 and the right tool beam 32 are then supported on the ground to a comparable extent by a part of their weight and extend transversely with respect to the direction of travel 5. A part of the weight of the left tool beam 30 and the right tool beam 32 is transferred by means of the left cylinder assembly 44 and the right cylinder assembly 58, as well as by means of the hinges 44 and 54, to the coupling member 28. This part of the weight is transferred, together with the weight of the coupling member 28 itself, via the coupling rods 106, 108 and 110 to the support frame 26 which subsequently transfers the weight, via the three-point linkage 12, to the tractor 2. The to be transferred part of the weight of the left tool beam 30 and the right tool beam 32 also causes a moment that is transferred to the support frame 26, via a horizontal component of the longitudinal forces in the coupling rods 106, 108 and 110 and via the left and the right support point 96, 98 and the left and the right abutment member 92, 94.

Figure 6:
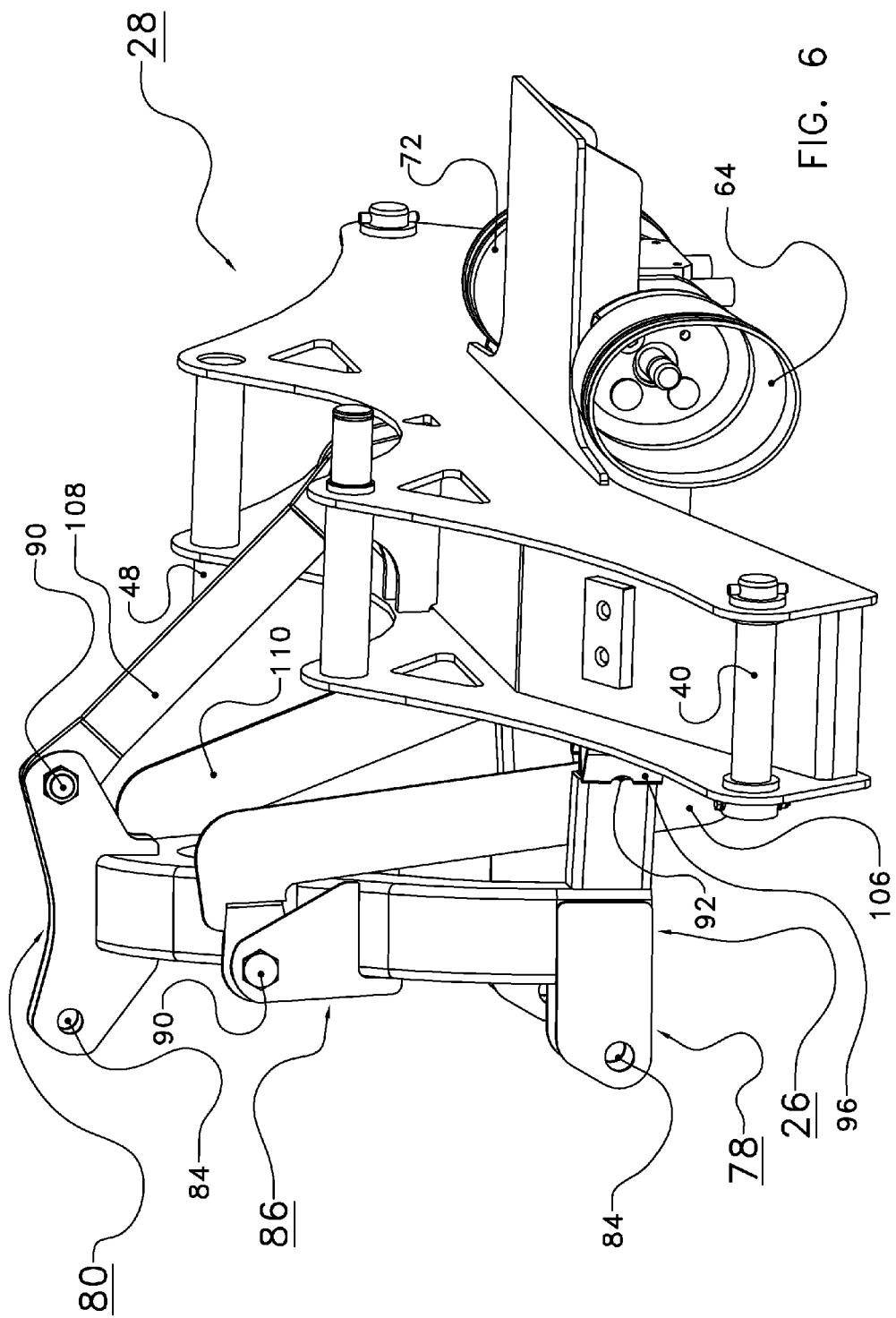
FIG. 6 shows the support frame and the coupling member in the view of FIG. 5, with the coupling member in a first broken-out position.

When the right tool beam 32 collides with an obstacle, such as a non-shown stone, the right tool beam 32 can break out in order to avoid, or at least to reduce, damage of the mowing device 4. The obstacle exerts a force on the right tool beam 32, which force is opposite to the direction of travel 5. As a result of this force, the coupling member 28 will rotate around an imaginary axis of rotation which has a vertical directional component. This is enabled by the coupling rods 106, 108 and 110, and by the left support point 96 and the left abutment member 92, as shown in FIG. 6. Owing to the fact that the coupling rods 106, 108 and 110 extend obliquely rearwards, the imaginary axis of rotation has also a horizontal component parallel to the direction of travel 5. The coupling member 28 thus rotates in such a manner that the hinge 54 of the right tool beam 32 is raised. The left coupling hole 100, the coupling hole 102 located in the middle, and the right coupling hole 104 then describe a path of movement with respect to the left double attaching plate 78, the double attaching plate 80 located in the middle, and the right double attaching plate 82.

The rotation and lifting of the coupling member 28 is partially transferred to the right tool beam 32 itself. On account of the spring action of the cylinder assembly 58, the right tool beam 32 will rotate downwards around the hinge 54, as a result of which the mowing discs 38 will still remain supported on the ground at a relatively small rotation of the coupling member 28. The spring action of the cylinder assembly 58 then ensures that the ground unloading increases. At a larger rotation, the spring force exceeds the corresponding component of the weight of the right tool beam 32 and the right tool beam 32 is raised, as shown in FIGS. 8 and 9. On account of the increased ground unloading, the lifting of the right tool beam 32, respectively, said tool beam can move over the obstacle in question. On account of the spring action of the cylinder assembly 58, the right tool beam 32 will then remain substantially horizontal, so that, despite the obstacle, the mowing pattern will be as regular as possible.

The coupling member 28 rotates with the left support point 96 around the left abutment member 92 at a rearward and upward rotation of the right tool beam 32. There is thus created a larger rotating arm than in the case when the right tool beam 32 would rotate around a point in the middle of the mowing device 4, or at the same right side as the right tool beam 32, like in the state of the art. On account of this larger rotating arm, it suffices for the right tool beam 32 to make a smaller angle of rotation to achieve the same deflection. Additionally, the difference in deflection between a tool 38 at an inner side, in this case the left side of the right tool beam 32, and a tool 38 at an outer side, in this case the right side of the right tool beam 32, is smaller.

Figure 7:
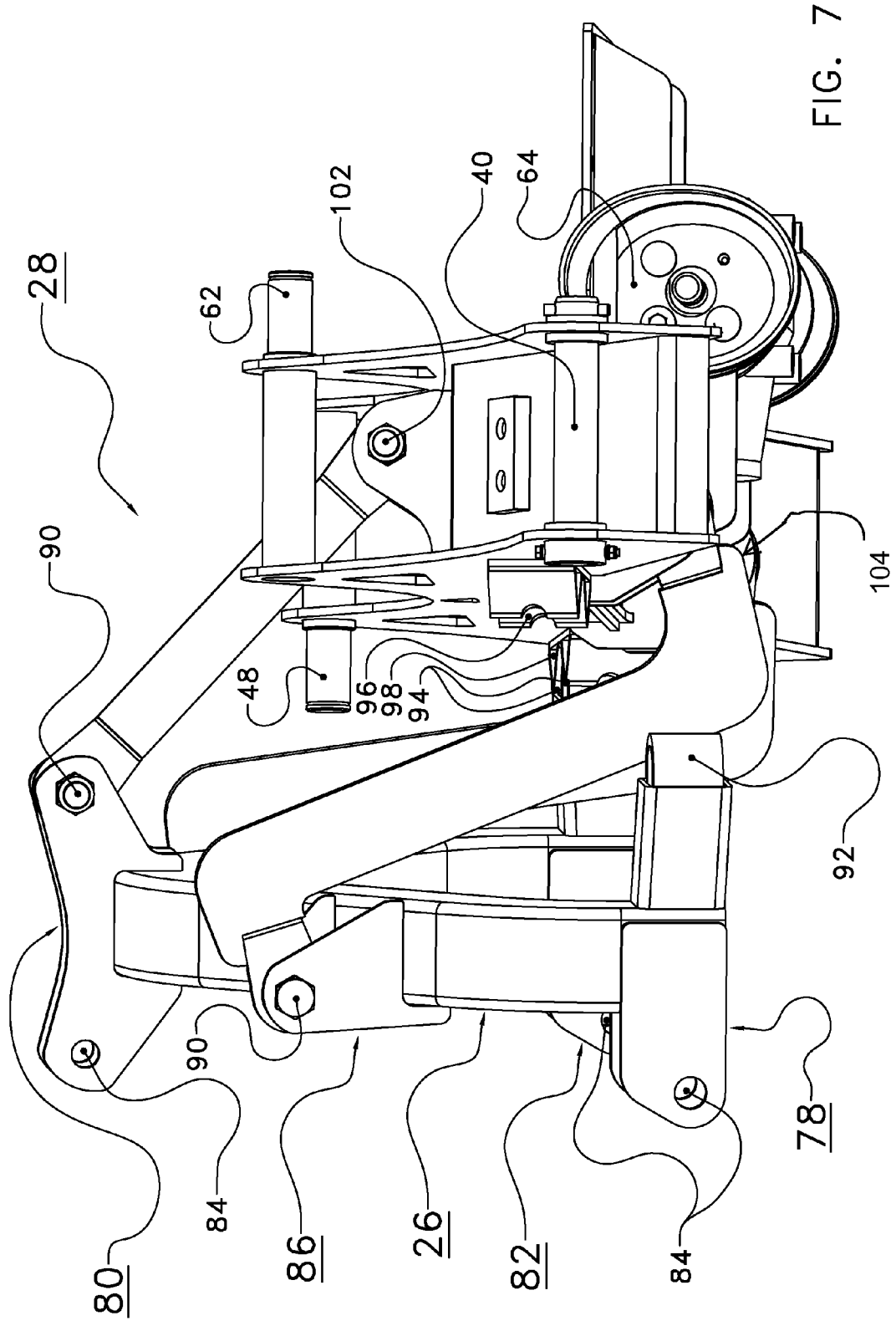
FIG. 7 shows the support frame and the coupling member in the view of FIG. 5, with the coupling member in a second broken-out position.

When the left tool beam 30 meets an obstacle, it will break out in a comparable manner as described above in relation to the right tool beam 32, mutatis mutandis, in which case the same advantages will be achieved. This is shown in FIGS. 7, 10 and 11. In this case, the paths of movement of the coupling points, in this embodiment the left coupling hole 100, the coupling hole 102 located in the middle, and the right coupling hole 104, are mirrored about a vertical longitudinal plane through the middle of the mowing device 4 with respect to the breaking out of the right tool beam 32. In this embodiment, the path of movement of the left coupling hole 100 is relatively small at a rearward deflection of the right tool beam 32. The closer the position of the respective coupling point to the associated, in this case left, support point 96, the smaller the path of movement. At a deflection of the other, in this case left, tool beam, the path of movement of the same left coupling point is relatively large.

When the left tool beam 30 and the right tool beam collide with an obstacle more or less simultaneously, the coupling member 28 will be raised as a whole and then come free from the two abutment members 92, 94. The two tool beams 30, 32 are thus lifted over the obstacles in question. Further advantages are that only one coupling member 28 is required for two tool beams 30, 32 and that relatively simple coupling elements are used.

In this embodiment, the force that an obstacle has to exert on the tool beams 30 or 32 to cause them to break out, is adjustable by means of the cylinder assemblies 44, 58. By increasing the ground unloading by means of said cylinder assemblies 44, 58, a larger part of the weight of the tool beams 30 and 32 is transferred via the coupling member 28 and the coupling rods 106, 108 and 110. As a result thereof, inter alia the longitudinal forces in the abutment members 92 and 94 and the support points 96 and 98 will increase, so that a larger moment is required to cause the coupling member 28 to rotate.

An alternative embodiment of the mowing device 4 according to the present invention is shown in FIGS. 12 to 18 and will be described with reference thereto. This alternative embodiment is substantially equal to the above described embodiment(s) of the mowing device according to the present invention and only the differences will be described. Therefore, for further explication of the general functioning of the mowing device as described in FIGS. 12 to 18, reference is made to the description of FIGS. 1 to 11. Identical or corresponding parts/components of the mowing device will be denoted in the drawings by the same reference numerals.

Figure 12:
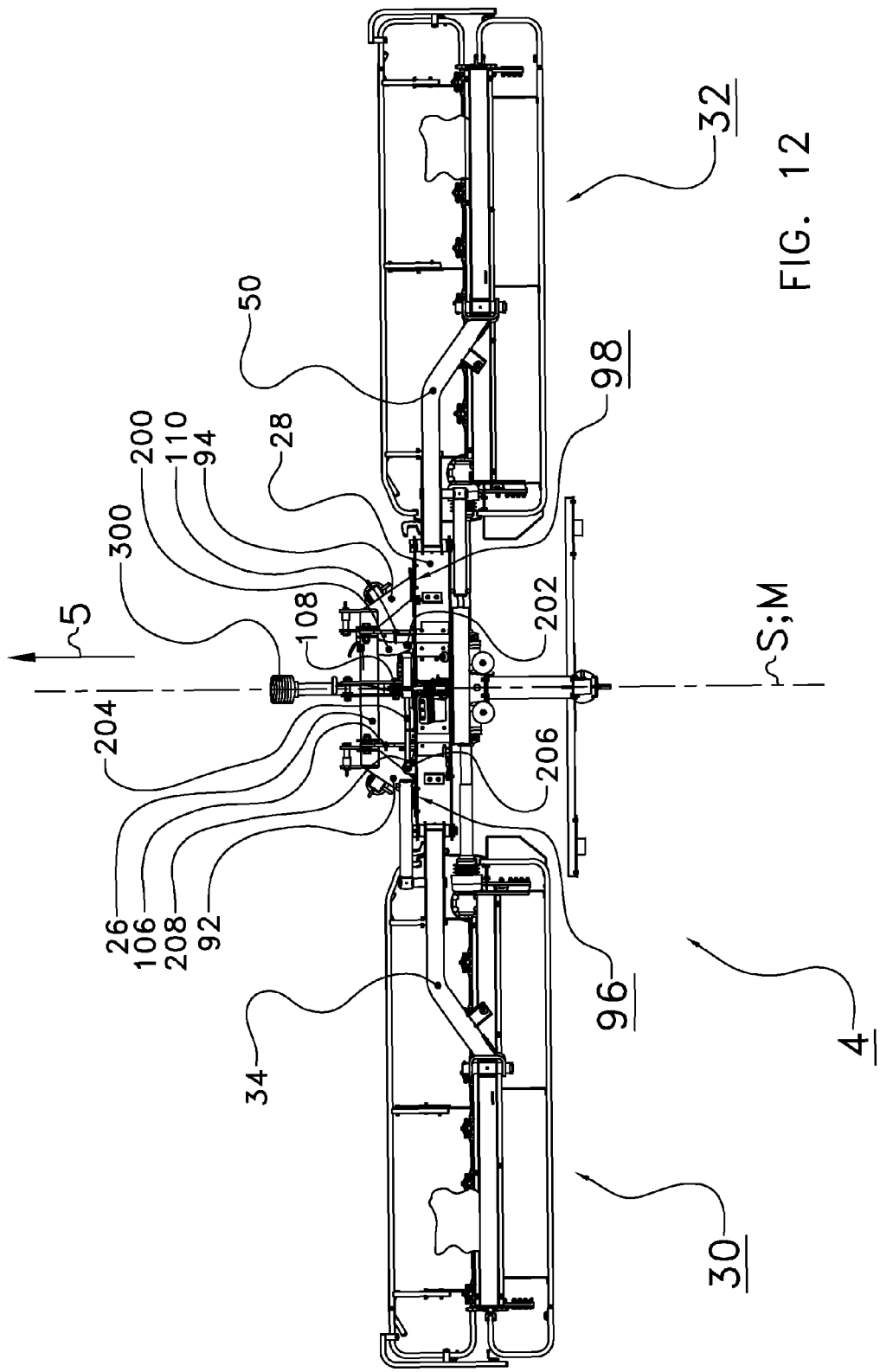
FIG. 12 is a top view of an alternative embodiment of the implement in a middle position.
Figure 13:
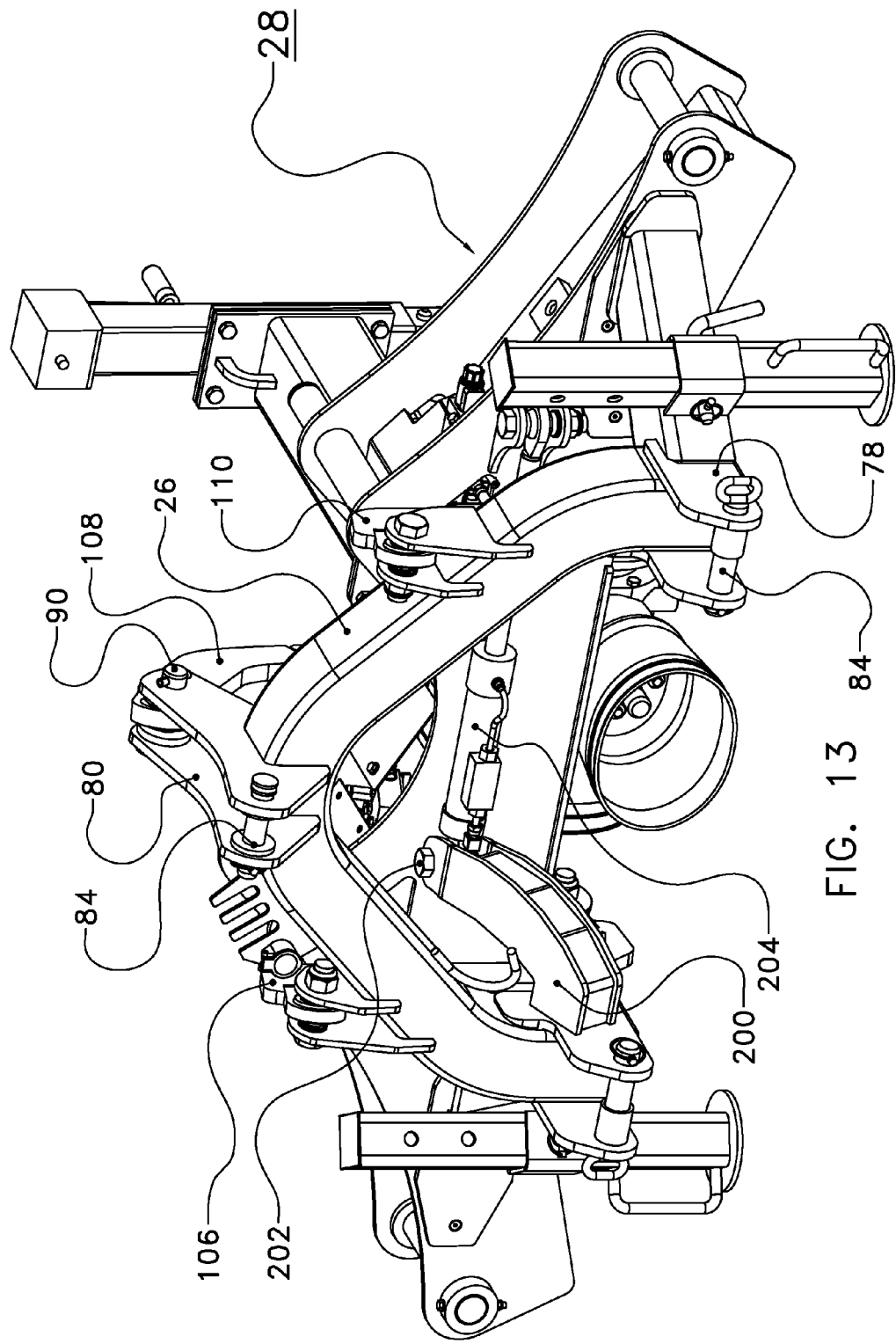
FIG. 13 is a perspective view of the coupling member and the support frame.

FIG. 12 is a top view of an alternative embodiment of the mowing device 4 according to the invention. FIG. 13 is a more detailed perspective view of the support frame 16 and the coupling member 28 coupled thereto.

The mowing device 4 comprises the left tool beam 30 and the right tool beam 32 which are each connected to the coupling member 28 by means of the left intermediate arm 34, the right intermediate arm 50, respectively. The coupling member 28 is movably connected to the support frame 26, in the same manner as described above, by means of coupling elements 106, 108 and 110. The left abutment member 92 and the right abutment member 94 are again provided on the support frame 26. In contrast with the embodiment shown above, the free ends of the abutment members 92, 94 are designed as flat ones instead of as V-shaped ones, in particular the free ends of the abutment members 92, 94 are provided with support plates 92a, 94a. The support points 96, 98 provided on the coupling member 28 are also designed as flat ones. There is provided a stabilisator 204 which is active between the coupling member 28 and the support frame 26. The stabilisator 204 is designed as an elongate body and its (in the figure) left free end is hingeably connected to the coupling member 28 by means of a ball hinge 206 on a cam 208, which cam 208 is rigidly connected to the coupling member 28. The (in the figure) right second free end of the stabilisator 204 is hingeably coupled to an arm 200 by means of a ball hinge 202. The arm 200 is rigidly connected to the support frame 26. The cam 208 and the hinge 206 are located near the first coupling element 106. The hinge 202 is located near the third coupling element 110. In other words, the stabilisator 204 substantially extends between the first coupling element 106 and the third coupling element 110.

Figure 14:
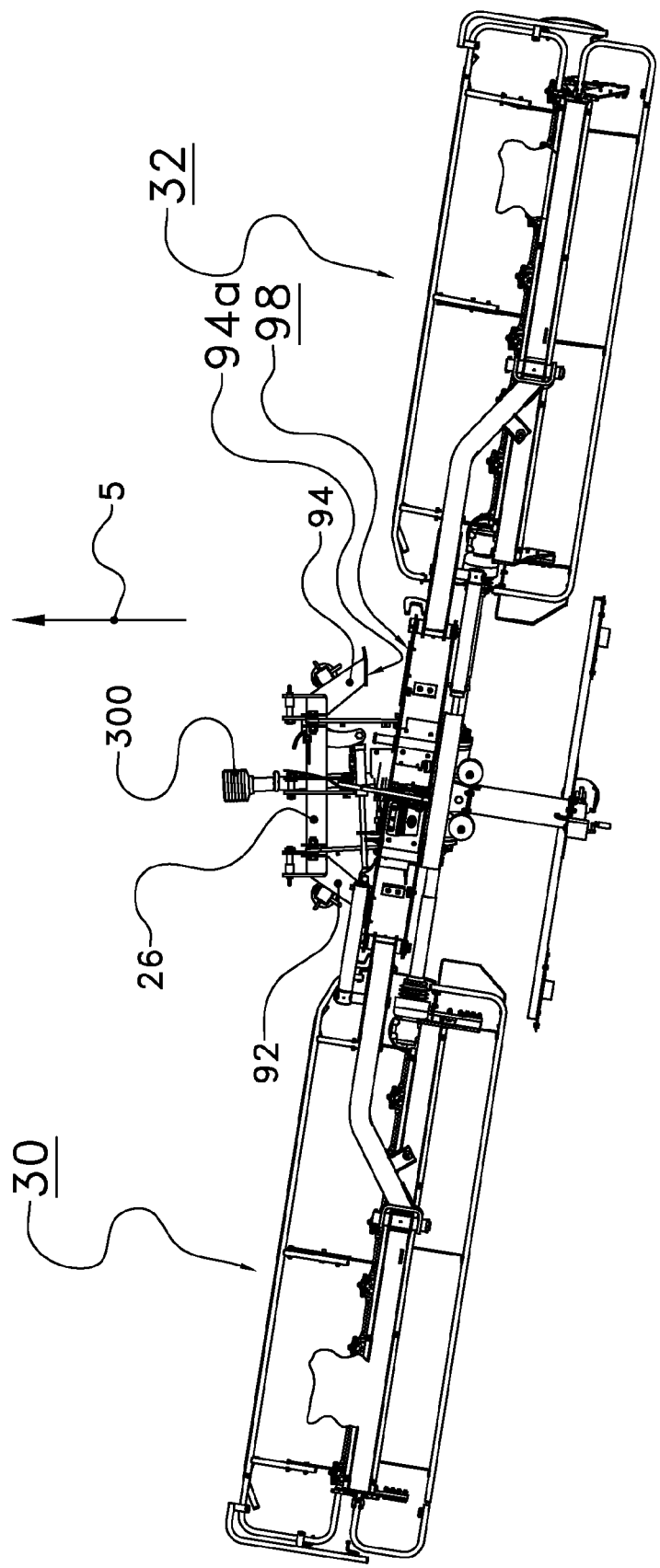
FIG. 14 shows a top view of the alternative implement in a first broken-out position.
Figure 15:
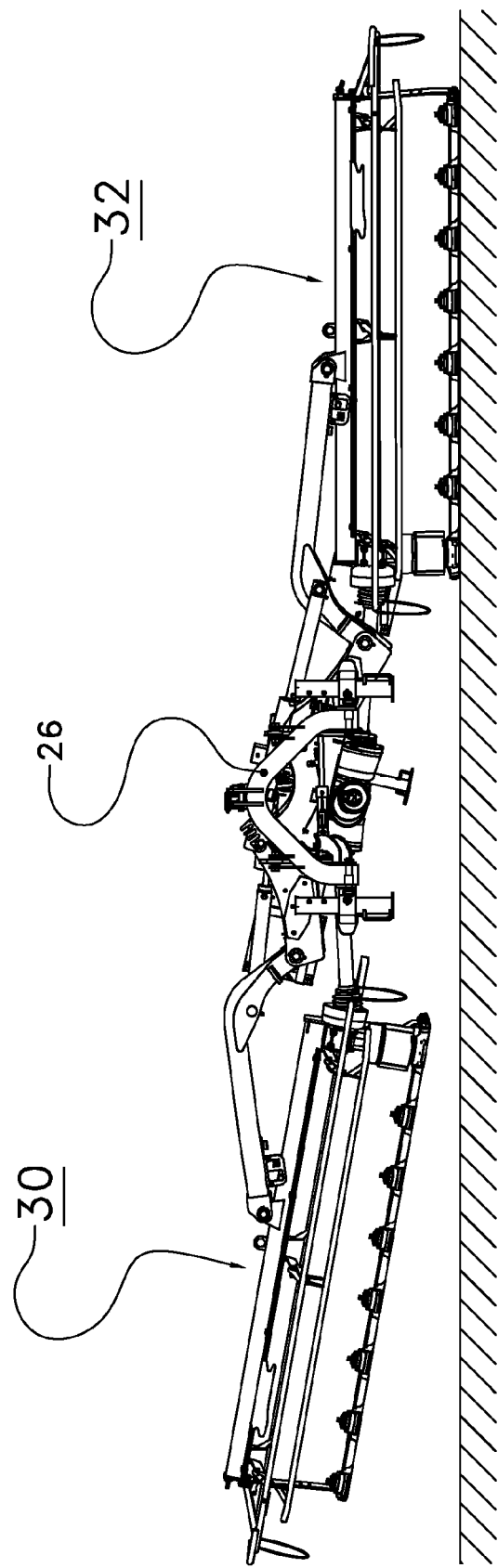
FIG. 15 shows a rear view of the alternative implement in the first broken-out position.
Figure 16:
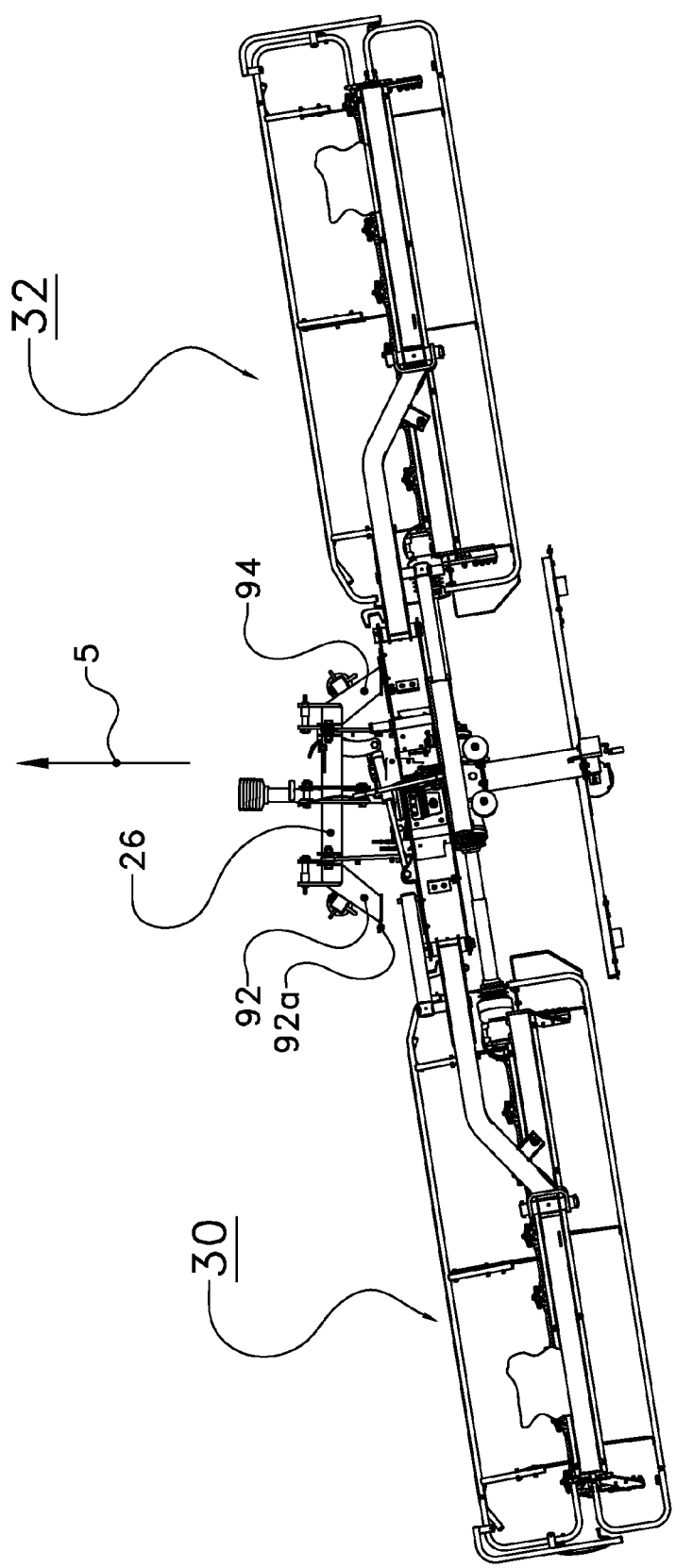
FIG. 16 shows a top view of the implement in a second broken-out position.

The stabilisator 204 has as a function to suppress sideward movements of the mowing device 4 during use, but to allow indeed a movement as described above when one of the tool beams 30, 32 meets an obstacle. This is shown in FIGS. 14-16, in which the right tool beam 32, the left tool beam 30, respectively, avoids an obstacle in a manner as described inter alia with reference to FIGS. 8 and 9 and will not be resumed here.

In a first embodiment, the stabilisator 204 is designed as a rod having a fixed length. In a second embodiment, the stabilisator 204 is designed as a rod which is adjustable in length, in particular in the form of a hydraulic cylinder or an analogous solution. This is the embodiment as shown in FIGS. 12 to 18.

Figure 17:
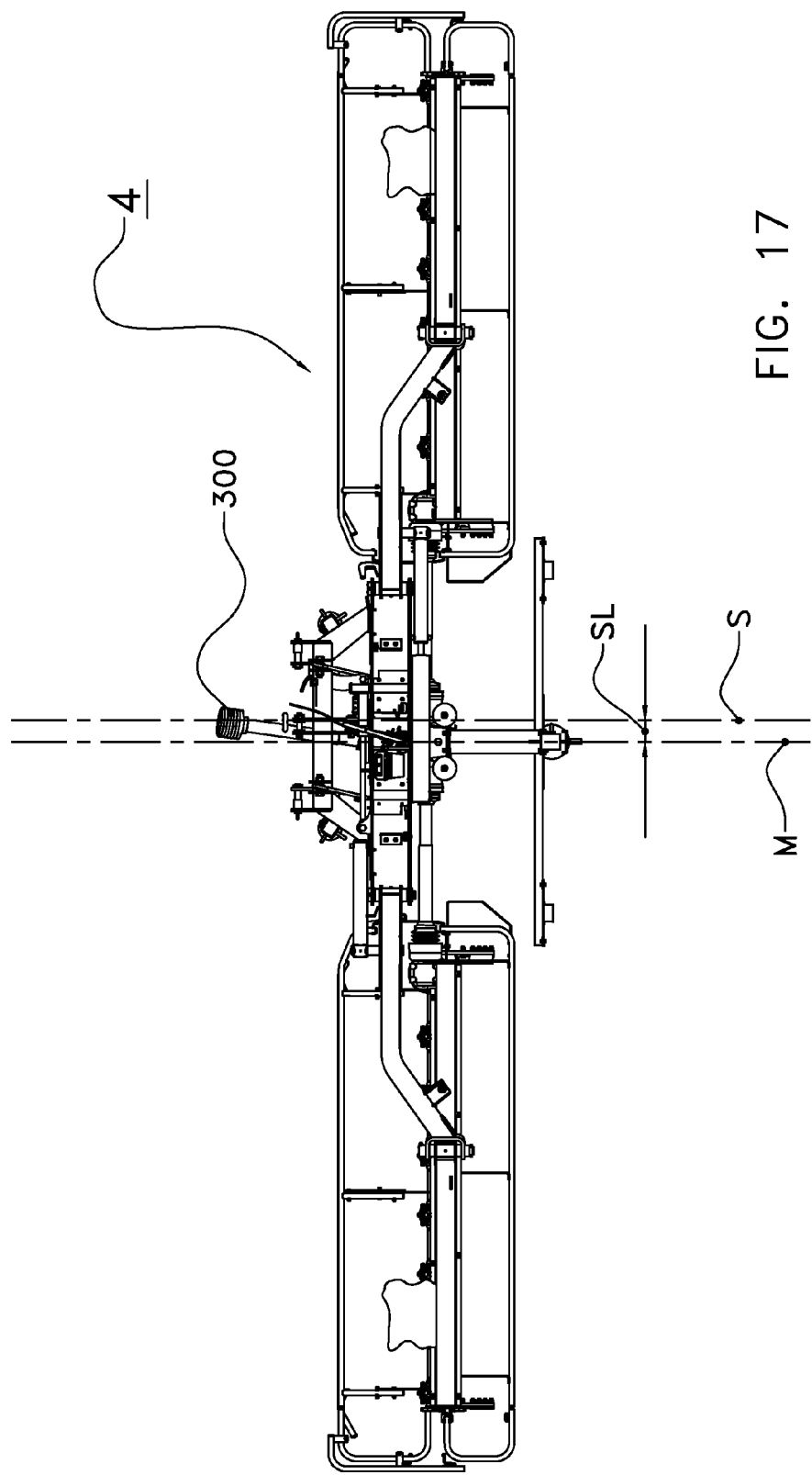
FIG. 17 shows a top view of the alternative implement in a first offset-out position.

FIG. 12 shows the mowing device 4 in a neutral or middle position. In this neutral position, the stabilisator 4 has also assumed a neutral or middle position. In the shown neutral position, the longitudinal axis S of the (non-shown) tractor coincides with a longitudinal axis M of the mowing device 4. In the figure, the tractor is located at the upper side of the mowing device 4 and is coupled, during use, to a drive shaft 300 of the mowing device 4. Adjustment of the length of the stabilisator 4 enables to adjust the position of the mowing device 4 behind the tractor in sideward direction. FIG. 17 shows that the length of the stabilisator 4 has increased with respect to its length in the neutral or middle position. In other words, FIG. 17 shows in a top view the mowing device 4 in a first offset position. In the case that the stabilisator 4 is a hydraulic cylinder, the cylinder is energized and the piston is extended. As shown in FIG. 17, the increase in length of the stabilisator results in a sideward displacement of the mowing device 4 with respect to the (non-shown) tractor. In the shown case, the mowing device 4 has been displaced to a position to the left of the longitudinal axis S of the tractor over a distance denoted by SL.

Figure 18:
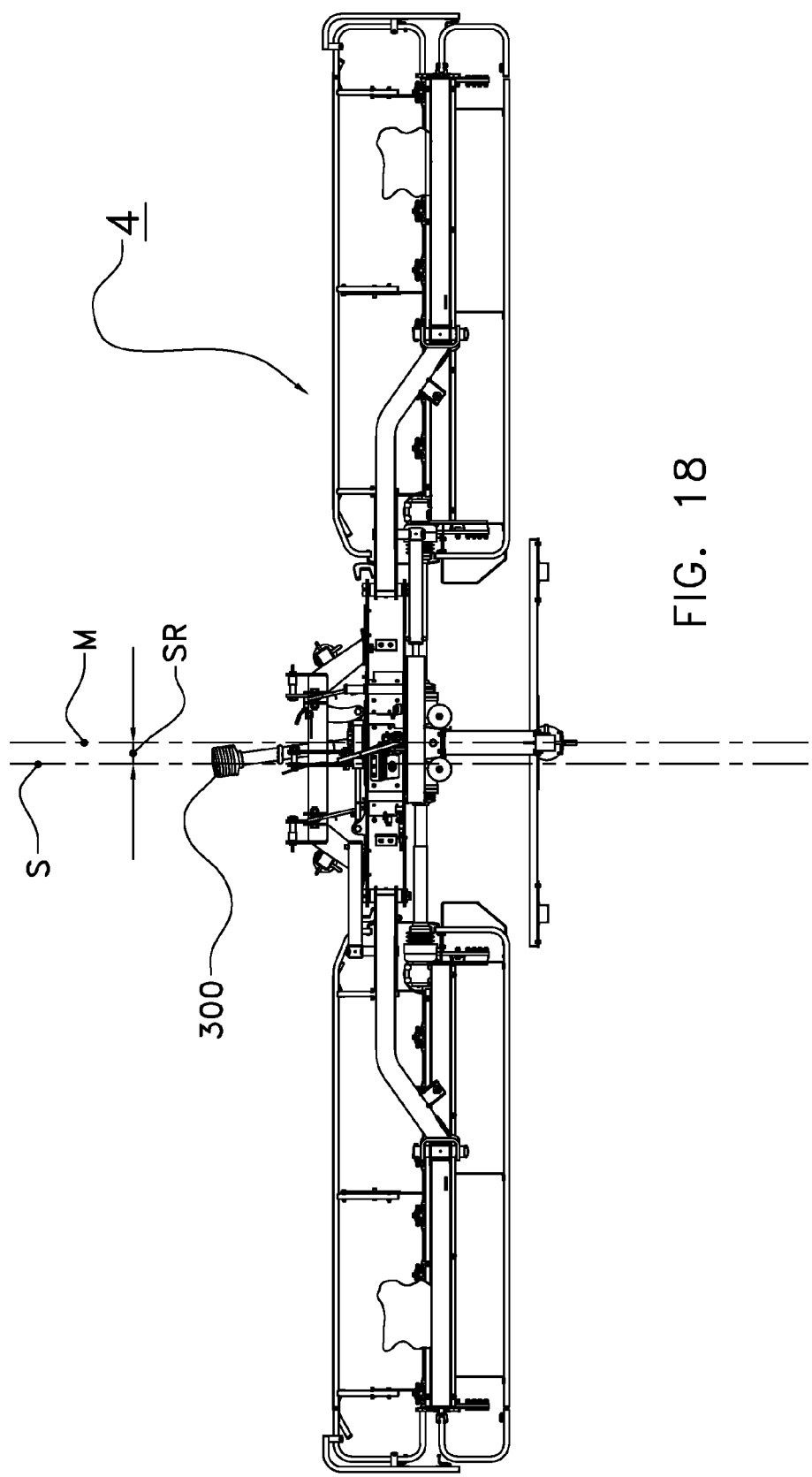
FIG. 18 shows a top view of the alternative implement in a second offset position.

In an analogous manner, the length of the stabilisator 4 can be reduced, which results in a sideward displacement of the mowing device 4 to the right side of the (non-shown) tractor over a distance denoted by SR. This is shown in FIG. 18 in which, in a top view, the mowing device 4 is shown in a second offset position. In this manner it is possible to give the mowing device 4 an offset position, which is especially useful when the mowing device 4 is used on slopes.

Setting the offset position of the mowing device 4 can take place automatically, for example by measuring an angle of inclination at right angles to the direction of travel, but can also be carried out manually by the tractor driver. In the case that the stabilisator 4 is a hydraulic cylinder, the positioning of the mowing device 4 and the stabilisator 4 into the middle position can be achieved advantageously if the stabilisator 4 is designed as a double-acting cylinder having two compression chambers. By energizing both compression chambers, automatically or manually, the middle position will be assumed.

In a non-shown variant of the invention, the force that an obstacle has to exert on tool beams to cause them to break out can be set by means of at least one adjustable pressure cylinder which extends from a support frame to a coupling member.

Within the scope of the invention, many other embodiments and variants are possible. The coupling element may for example be a rod, in particular a rod with a fixed length, or a cylindrical or telescopic element with a variable length. In another embodiment, the coupling element may be a groove in a part of the support frame and a pin is provided in a coupling point of a coupling member to form a pin-groove connection. The groove then defines a path of movement for a guided movement. In a variant, the pin may be provided on a support frame and the groove may be provided in a part of a coupling member.

Instead of being designed as a mowing device, the implement may be configured to carry out other operations, such as hay-tedding or hay-turning, ploughing or harrowing a field. For this purpose, rakes, tines, discs or knives can be selected as tools. Instead of ball joints, the attaching means may also comprise simple or composite hinges and/or positively locked connecting means, or friction locked connecting means. The coupling member may be wider, or on the contrary smaller than shown, also in dependence on the desired tool beams and tools and the presence or absence of tools at a front side of the tractor in question. The coupling member may also have another shape than the shown reversed U-shape.

The invention is particularly advantageous in a double, symmetric embodiment with a tool beam provided on either side of the coupling member, owing to the fact that the single coupling member, with the coupling elements in question, enables a breaking out of both tool beams. Nevertheless, the invention also offers advantages in a single embodiment, with one tool beam being present. The break out mechanism is thus simpler than state-of-the-art mechanisms.

The coupling points and coupling element attaching points are advantageously designed as holes, through which a pin can be inserted. It is, for example, also possible for a coupling point and/or coupling element attaching point to be designed itself as a pin on which an eye is disposed that is provided on a coupling element.

The support points and abutment members may also be provided inversely, in which case a projecting element is provided on a coupling member and a complementary element is provided on a support frame. By V-shape are also meant, in relation to the abutment member, comparable shapes, such as U-shapes, in which case a characteristic feature is that there is a positively locked connection in the transverse direction of the implement. Instead of a positively locked connection, the support point and the abutment member may also form a friction locked connection in the transverse direction.

Other spring means than the shown combination of cylinder and accumulator are possible, such as mechanic spring means, for example in the form of a leaf spring or a coil spring.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An implement for carrying out operations on an agricultural land, which implement is configured to be moved in a direction of travel by a tractor with a three-point linkage, the implement comprising:
   attaching mechanism for attaching the implement to the three-point linkage of the tractor;
   a coupling member, which is movably connected to the attaching mechanism and which comprises a first, a second and a third coupling point;
      a first tool beam, which is attached to the coupling member and which extends from the coupling member substantially transversely to the direction of travel;
      at least one tool, which is supported by the first tool beam and which is configured to carry out the operations on the agricultural land; and
      a first, a second and a third coupling element, which are each movably attached to the coupling member in the region of the first, the second and the third coupling point, respectively, to connect the coupling member to the attaching mechanism;
   wherein the first coupling element defines a path of movement for a guided movement of the first coupling point with respect to the attaching mechanism, wherein:
      the second and the third coupling element each define a path of movement for a guided movement of the second and the third coupling point, respectively, with respect to the attaching mechanism, wherein the implement further comprises a support frame at its side that faces the tractor, at least a part of the attaching mechanism is provided on the support frame and at least a part of the coupling elements is connected to the attaching mechanism via the support frame and wherein the support frame comprises a first abutment member and the coupling member comprises a first support point which co-operates with the first abutment member, to transfer a force in the direction of travel of the implement.

2. The implement according to claim 1, wherein the first abutment member is located on a coupling member part situated opposite to the first tool beam.

3. The implement according to claim 1, wherein at least one of the first, the second and the third coupling element is a rod which is hingeably connected to the coupling element in the region of the respective coupling point.

4. The implement according to claim 1, further comprising a second tool beam which supports at least one tool, is attached to the coupling member and extends from the coupling member in a direction substantially opposite to the direction of the first tool beam.

5. The implement according to claim 1, wherein the support frame comprises a second abutment member and the coupling member comprises a second support point which co-operates with the second abutment member, to transfer a force in the direction of travel of the implement.

6. The implement according to claim 5, wherein the first and the second abutment member are located in a plane transverse to the direction of travel on either side of the middle of the support frame.

7. The implement according to claim 1, wherein the first coupling element is a first rod, the second coupling element is a second rod, and the third coupling element is a third rod, and wherein the first, the second and the third rod each extend from the coupling member to the support frame, are each hingeably connected to the coupling element in the region of the respective coupling point and are each hingeably connected to the support frame.

8. The implement according claim 1, wherein the first and optionally the second tool beam are rotatably connected to the coupling member to pivot the tool beam in question upwards with respect to the coupling member.

9. The implement according to claim 8, further comprising a first actuator, which is connected to the coupling member and the first tool beam, to pivot the first tool beam.

10. The implement according to claim 8, further comprising a spring mechanism, which are connected to the coupling member and the first and optionally the second tool beam, to resiliently transfer at least a part of the weight of the tool beam in question to the coupling member.

11. The implement according to claim 1, further comprising a stabilisator, one free end of which is hingeably connected to the coupling member and a second free end of which is hingeably connected to the support frame.

12. The implement according to claim 11, wherein the stabilisator substantially extends between the first coupling element and the third coupling element.

13. The implement according to claim 11, wherein the stabilisator is adjustable in length.

14. The implement according to claim 13, wherein the stabilisator is a hydraulic cylinder which is adjustable in length.

15. The implement according to claim 14, wherein the stabilisator is a double-acting hydraulic cylinder.

16. An assembly for carrying out operations on an agricultural land, comprising an implement according to claim 1 and a tractor with a three-point linkage, wherein the implement is attached to the three-point linkage of the tractor with the aid of the attaching mechanism.

* * * * *